Feb. 26, 1929.
H. R. WOODROW
1,703,131
ELECTRICAL DISTRIBUTION SYSTEM
Original Filed Dec. 1, 1925
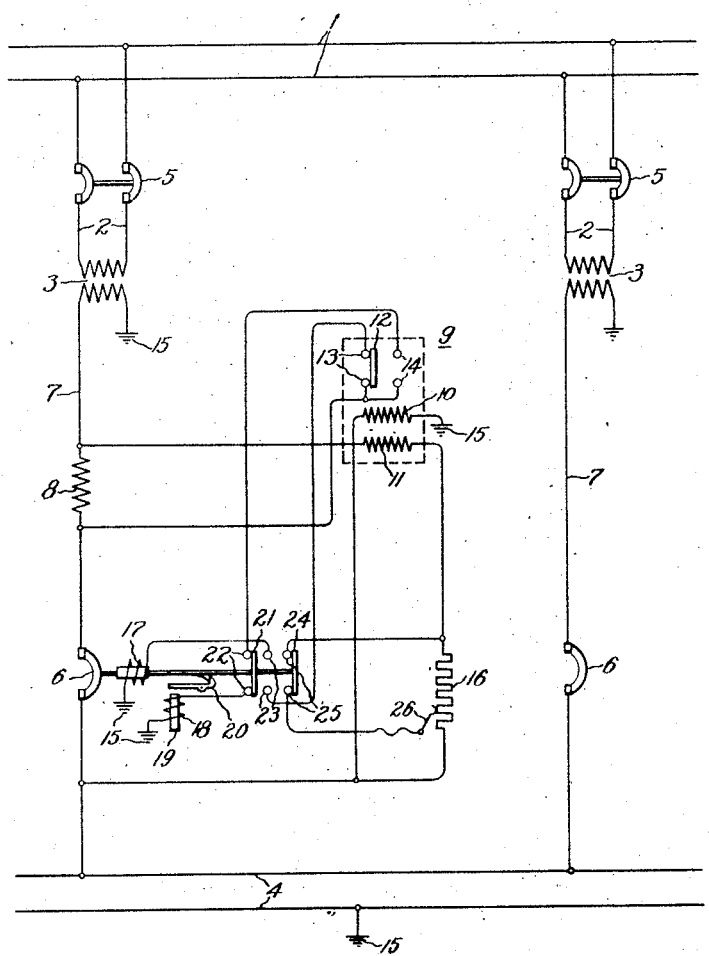
Inventor:
Harry R. Woodrow,
by *(signature)*
His Attorney.

Patented Feb. 26, 1929.

1,703,131

UNITED STATES PATENT OFFICE.

HARRY R. WOODROW, OF BROOKLYN, NEW YORK, ASSIGNOR TO GENERAL ELECTRIC COMPANY, A CORPORATION OF NEW YORK.

ELECTRICAL DISTRIBUTION SYSTEM.

Application filed December 1, 1925, Serial No. 72,592. Renewed July 17, 1928.

My invention relates to electrical distribution systems, and particularly to alternating-current distribution systems in which high voltage feeders supply distribution transformers interconnected on their low-voltage sides to form a network.

In an alternating-current distribution system provided with a plurality of high-voltage feeders, a failure of one of the feeders does not necessarily cause a failure of load supply to the network, since the sound feeders may be capable of maintaining continuity of service. However, if a feeder is disconnected at its source of supply or a short circuit occurs in the feeder, a reversal of energy flow will occur in that feeder as a result of the network supplying the magnetizing current for the transformer, or as a result of the network feeding power into a fault or short circuit on the feeder. It then becomes necessary to disconnect the distribution transformer to prevent feed back of energy from the network, and it is also desirable to reconnect the distribution transformer to the network when normal conditions have been restored.

Difficulties have arisen in providing a mechanism, which is simple and reliable in operation, to disconnect the distribution transformer from the network on reverse energy flow because of the great range of current values encountered, namely, a comparatively small value of magnetizing current and the high value of current due to a fault or short circuit fed from the network.

It is, therefore, an object of my invention to provide an improved means, which is simple, highly responsive, and reliable in operation, for disconnecting distribution transformers from a network on a reversal of energy flow and reconnecting the transformers to the network when normal conditions have been restored.

For the purpose of explaining the present invention, it has been illustrated in the accompanying drawing as applied to an alternating-current distribution system with an interconnected secondary system, but it will be understood that it may be applied to other systems of electric distribution and in general to two interconnected alternating-current circuits subject to a reversal of energy flow between the circuits.

The novel features which I believe to be characteristic of my invention are set forth with particularity in the appended claims, the invention itself, however, both as to organization and method of operation, together with further objects and advantages thereof will be best understood by reference to the following description taken in connection with the accompanying drawing in which the single figure is a schematic illustration of an alternating-current distribution system in which my invention has been embodied.

Referring to the drawing, 1 indicates the primary high-voltage mains of a distribution system connected to high-voltage feeders 2, supplying distribution transformers 3, which are interconnected on their low-voltage sides by the distributing network 4. Circuit breakers 5, of any suitable type, are interposed in the main feeders while network circuit breakers 6 are provided in the low-voltage mains 7 connected to the secondary winding of the distribution transformers. In order to simplify the disclosure, only one feeder is shown equipped with the apparatus for effecting the automatic disconnection and reconnection of the transformer secondary, but it will of course be understood that each feeder, or any desirable number of feeders, may be similarly equipped. An impedance 8, which is preferably an inductive apparatus, is inserted in series with the circuit breaker 6. Preferably I use a reactance arranged to saturate at a low value of load current so as to limit the current through the current coil and prevent excessive heating thereof under any value of load current attained during the operation of the system. A network relay 9 of the power-directional type is connected to control the operation of the network circuit breaker 6. Relay 9 is shown as comprising a voltage coil 10, a current coil 11, a contact 12, and contact points 13 and 14.

For simplicity of illustration, I have shown a secondary network which has one side thereof permanently connected to ground. One terminal of voltage coil 10 is grounded at 15 while the other terminal thereof is connected to the network. The current coil 11 is connected to the transformer-side of the device 8 and to the other side of the switch 6 through an adjustable impedance, shown as a resistance 16, which is used to limit the current through the current coil 11 when circuit breaker 6 is open. The coil 11 is referred to herein as a current coil in order to differentiate clearly from the voltage coil 10, but from the description hereinafter it will be apparent that the coil though responsive to current might be considered a voltage coil when circuit breaker 6 is open, since it is subjected to the difference in voltage resulting from the difference in magnitude and phase of the voltage between the transformer secondary and the network. Furthermore, the dual function performed by the single coil 11 eliminates an operating coil and makes the arrangement more sensitive to trip out the network switch, owing to the fact that coil 11 is not in mutual inductive relation with any other coil and thereby subjected to an opposing action rendering it less responsive.

Circuit breaker 6 is provided with closing and opening means shown as comprising a closing coil 17, and an opening coil 18 having a plunger 19 to disengage a latch 20 which holds the breaker closed when it is desired to have the distribution transformer connected to the network. The circuit breaker 6 is also provided with a contact 21 having contact points 22 and 23, and a contact 24 having contact points 25. The adjustable resistance 16 is connected across the contact points 25.

The closing coil 17 is connected to the circuit-breaker side of the device 8 in order to avoid a periodically opening and closing of the circuit breaker on an attempted reconnection. The closing coil 17 takes a comparatively large operating current and a part of this current will be supplied from the network as soon as the tips of the circuit breaker touch the breaker contacts. If the closing coil were connected to the feeder between the device 8 and the transformer secondary, the current supplied by the network would flow through the device 8 in the reverse direction and produce an opening torque in the power directional relay.

With the above description of the apparatus in mind, a better understanding of the various circuit conditions at different points of the cycle of operations may now be obtained. Assume that the network is energized by means of one feeder and that the other feeder has been disconnected by moving circuit breakers 5 and 6 in that feeder to the open position. Voltage coil 10 will be energized from the network and current coil 11 will be energized by a reverse current flow in a circuit from the network, through resistance 16, current coil 11, conductor 7, the secondary of transformer 3, to the ground 15. Contact 12 of relay 9 will now be subjected to an actuating torque and is arranged to close contact points 14. If circuit breaker 5 is now closed, the primary of transformer 3 and thereby its secondary will be energized from the supply mains 1. With circuit breaker 6 in the open position, current coil 11 is in a series circuit between the transformer secondary and the network, and is energized in accordance with the direction of current flow resulting from the difference in magnitude and phase of the voltage between the transformer secondary and the network. When the transformer voltage bears a certain relation to the network voltage, as for example, when it is slightly higher and in phase with the network voltage so as to permit energy flow from the transformer secondary to the network, the current coil 11 cooperating with the voltage coil 10 will move contact 12 to bridge its contact points 13. With circuit breaker 6 in the open position, contact 21 bridges its contact points 23 and a circuit will be completed for the circuit breaker closing coil 17 from transformer 3, the main 7, the device 8, contact 12, contact 21, coil 17, to the other side of the system, shown as a ground 15. Coil 17 is now instrumental in moving circuit breaker 6 to a circuit closing position and the latch 20 takes its illustrated position and holds the breaker closed.

As soon as circuit breaker 6 closes, power flow is from the transformer 3 into the network and current flows through the device 8 inserted in series with the line to the network. The current coil 11 is now energized in accordance with the direction of current in the device 8 and maintains contact 12 in the position taken initially. In this position of circuit breaker 6, a portion of the impedance 16 in series with the current coil is short-circuited by contact 24 which bridges the contact points 25 connected to one terminal of the impedance 16 and an adjustable slider 26. A portion of the impedance 16 remains in circuit as this may be found desirable in order to maintain the proper phase relation of the current in the current coil 11. In some cases the impedance 16 may be somewhat inductive with advantage.

Now if feeder 2 is deenergized by opening circuit breaker 5, transformer 3 will be magnetized from the network and a reverse current will flow through the current winding 11 which cooperates with the voltage coil 10 to move the contact 12 to bridge the contact points 14. This movement of the contact 12 completes a circuit for the opening coil 18 from the line 7, contact 12, contact 21, coil 18, to the other side of the system, shown as a ground 15. As soon as coil 18 is energized the plunger 19 is moved to a position to disengage the latch 20 and circuit breaker 6 moves to its open position thereby breaking the circuit through the opening coil 18. This movement of the breaker causes its contact 21 to bridge the contact points 23 in the circuit of the closing coil 17 and opens the short-circuit about the adjustable resistance 16. The current coil with a high resistance in series therewith is now the only connecting link between the deenergized feeder and the network. The same cycle of operations will take place for a reversal of energy flow due to a fault or short circuit in feeder 2.

When circuit breaker 5 is closed and the conditions of potential, both as to magnitude and phase, are such as to permit energy flow from the primary mains to the network, current coil 11 will be instrumental in moving contact 12 to bridge its contact points 13. A circuit is again completed for the closing coil 17 and circuit breaker 6 will be removed to its circuit closing position in the same manner as described before the reversal of energy flow.

While in the foregoing there has been shown and described the preferred embodiment of this invention, it is to be understood that changes in the details of construction, combination, and arrangement of parts may be resorted to without departing from the spirit and scope of the invention as claimed.

What I claim as new and desire to secure by Letters Patent of the United States, is,—

1. A transformer circuit controlling system for alternating-current networks wherein a switch is provided for connecting and disconnecting the secondary of the transformer and the network in accordance with the direction of current flow in the transformer secondary, comprising in combination a directional relay provided with a voltage responsive winding and only one current responsive winding, an inductive apparatus connected in series with the switch between said network and the transformer secondary, said current responsive winding being directly in a circuit connected around said inductive apparatus and switch, there being no connection to said current winding between said inductive apparatus and switch whereby when the switch is open said current winding is energized in accordance with the direction of the current flowing in said circuit, and whereby when the switch is closed said current winding is energized in accordance with the direction of current in said inductive apparatus.

2. A transformer circuit controlling system for alternating-current networks wherein a switch is provided for connecting and disconnecting the secondary of the transformer and the network in accordance with the direction of current flow in the transformer secondary, comprising in combination a directional relay provided with a voltage responsive winding and a current coil with its terminals connected respectively to the network and the transformer secondary whereby said coil is directly connected in a circuit between said network and said transformer secondary, an impedance in series with said current coil for limiting the current through the current coil when said switch is open, said current coil co-operating with said voltage responsive winding _erate the relay to effect closing of said switch when current flows from said transformer secondary to said network, and an inductive apparatus connected in series with the switch between said network and transformer secondary, said inductive apparatus and switch being between the points of connection of said current coil to the network and transformer secondary whereby said current coil is energized from said inductive apparatus when said switch is closed and cooperates with said voltage responsive winding to operate the relay to effect opening of said switch when current flows from said network through said inductive apparatus to said transformer secondary.

3. In combination, two alternating-current electric circuits, a switch for interconnecting said electric circuits, an inductive apparatus in series relation with said switch, and a directional relay comprising a voltage responsive winding and only one current coil, said current coil being connected in shunt with the portion of the circuit which includes said inductive apparatus and switch in series and adapted to be energized in accordance with the direction of current flow in said inductive apparatus when said switch is closed and being directly in a circuit between said electric circuits so as to be energized in accordance with the difference in magnitude and phase of the voltage between said electric circuits when said switch is open, said current coil cooperating with said voltage responsive winding to operate the relay for effecting closing of said switch when current flow is in one direction between said electric circuits and for effecting opening of said switch when current flow is in the reverse direction between said electric circuits.

4. A transformer circuit controlling system for alternating-current networks wherein a switch is provided for connecting and disconnecting the secondary of the transformer and the network in accordance with the direction of current flow in the transformer secondary, comprising in combination a directional relay provided with a voltage responsive winding and only one current responsive winding, an impedance connected in series with the switch between said network and the transformer secondary, said current responsive winding being directly in a circuit connected around said impedance and switch, there being no connection to said current responsive winding between said impedance and switch whereby when the switch is open said current responsive winding is energized in accordance with the direction of the current flowing in said circuit, and whereby when the switch is closed said current responsive winding is energized in accordance with the direction of current in said impedance.

5. A transformer circuit controlling system for alternating-current networks wherein a switch is provided for connecting and disconnecting the secondary of the transformer and the network in accordance with the direction of current flow in the transformer secondary, comprising in combination a directional relay provided with a voltage responsive winding and only one current responsive winding, a reactance connected in series with the switch between said network and the transformer secondary, said current responsive winding being directly in a circuit connected around said reactance and switch, there being no connection to said current responsive winding between said reactance and switch whereby when the switch is open said current responsive winding is energized in accordance with the direction of the current flowing in said circuit, and whereby when the switch is closed said current responsive winding is energized in accordance with the direction of the current in said reactance.

6. In combination, two alternating-current electric circuits, a switch for interconnecting said electric circuits, an inductive apparatus in series relation with said switch, a directional relay comprising a voltage responsive winding and only one current responsive winding, an impedance connected in series relation with said current responsive winding, and means for effecting a decrease in the amount of said impedance in the circuit of said current responsive winding when said switch is closed and for effecting an increase in the amount of said impedance when said switch is open, said current responsive winding being adapted to be energized in accordance with the direction of current flow in said inductive apparatus when said switch is closed and being directly in a circuit between said electric circuits so as to be energized in accordance with the difference in magnitude and phase of the voltage between said electric circuits when said switch is open.

7. A transformer circuit controlling system for alternating-current networks wherein a switch is provided for connecting and disconnecting the secondary of the transformer and the network in accordance with the direction of current flow in the transformer secondary, comprising in combination a directional relay provided with a voltage responsive winding and a current responsive winding with its terminals connected respectively to the network and the transformer secondary whereby said coil is directly connected in a circuit between said network and transformer secondary, an impedance connected in series with said current coil for limiting the current to the current coil when said switch is open, auxiliary switching means associated with said switch and arranged for short circuiting said impedance when said switch is closed and inserting said impedance when said switch is open, said current coil cooperating with said voltage coil to operate the relay to effect closing of said switch when current flows from said transformer secondary to said network, an impedance connected in series with said switch between said network and said transformer secondary whereby said current responsive winding is energized from said impedance and cooperates with said voltage responsive winding to operate the relay to effect opening of said switch when current flows from said network through said impedance and switch to said transformer secondary.

8. A transformer circuit controlling system for alternating-current networks wherein a switch is provided for connecting and disconnecting the secondary of the transformer and the network, comprising in combination a reactance in series with said switch, a directional relay provided with a voltage responsive winding and only one current responsive winding adapted to be energized in accordance with the direction of current flow in said reactance when said switch is closed and to be directly energized in accordance with the difference in the magnitude and phase of the voltage between said transformer secondary and the network when said switch is open, a resistance connected in series with said current responsive winding, and auxiliary switching means arranged to short circuit said resistance when said switch is closed and to insert said resistance when said switch is open.

In witness whereof, I have hereunto set my hand this 28th day of November, 1925.

HARRY R. WOODROW.